3,098,710
ALKALI AND SULFITE RECOVERY
Nils Knut G. Ahlborg and Karl N. Cederquist, Falun, Sweden, assignors to Stora Kopparbergs Bergslags Aktiebolag, a corporation of Sweden
Filed July 16, 1959, Ser. No. 827,498
3 Claims. (Cl. 23—129)

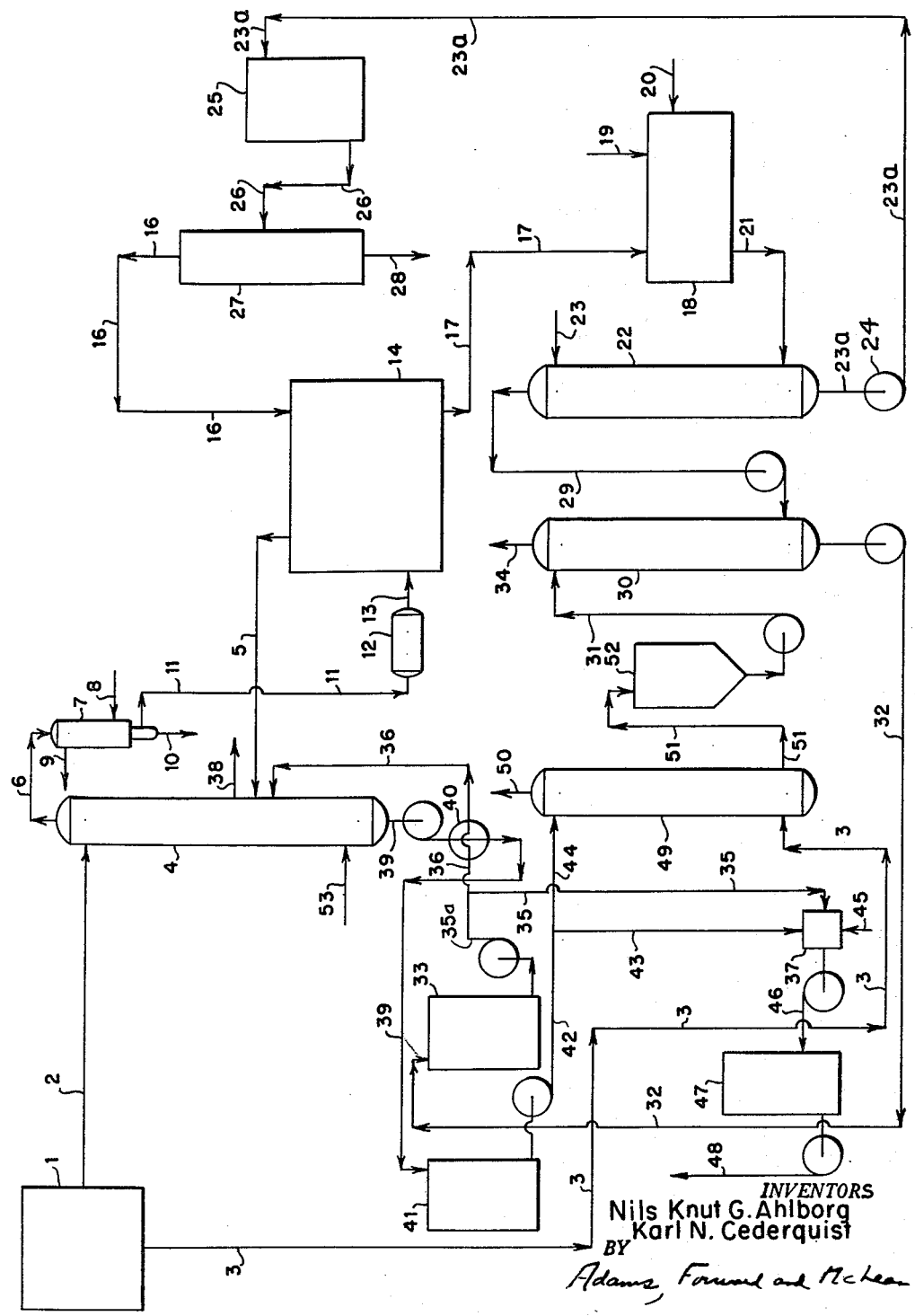

The present invention for the recovery of the chemicals out of waste lyes from the manufacture of cellulose by digesting ligno-cellulose-containing materials such as wood, straw and peat-moss, with alkaline sulfite and/or alkaline bisulfite or bisulfite and free $SO_2$ in one or more steps is applicable in all those cases where the waste lye obtained contains ligno-sulfonates of alkaline metals, such as sodium ligno-sulfonate.

If such sodium-containing waste lyes are evaporated entirely or in part, for instance nearly to dryness or to a dry percentage of 40–60%, and are combusted in a recovery boiler, a melt soda is obtained which substantially consists of soda, sodium sulfide and smaller quantities of sodium sulfate, sulfite and thiosulfate. Flue gas containing sulfur dioxide is also obtained.

It is known since long ago to recover the sulfide sulfur out of solutions ("smelt liquor") of this melt soda in a process where carbon dioxide gas in excess is reacted with the solution to produce a gaseous mixture which contains the excess carbon dioxide and hydrogen sulfide and at the same time produce a solution which is substantially free of sulfide sulfur. It is also known to react this solution with sulfur dioxide whereby carbon dioxide is released and a solution of a sodium sulfite is formed, such solution being useful as such or with further treatment in the processing of further quantities of wood to produce pulp. In addition, it is known to react the hydrogen sulfide present in the carbon dioxide gas with sulfur dioxide to produce elemental sulfur and react the elemental sulfur with air to produce sulfur dioxide for use in reaction with the hydrogen sulfide and also for use in reaction with the solution after it has been substantially freed of sulfide sulfur by reaction with carbon dioxide.

In order for the reaction between the solution of the melt soda to proceed most satisfactorily, such solution must be reacted with substantially pure carbon dioxide, inasmuch as if the carbon dioxide is admixed with oxygen, for example, deletereous reactions will take place, and also inasmuch as if the carbon dioxide is admixed with any substantial amount of an inert gas, such as nitrogen, the reaction will be slowed down and hence a larger piece of equipment providing a larger reaction zone will be required. Likewise, in the reaction in which the carbon dioxide is released, aqueous sodium bisulfite, rather than sulfur dioxide gas admixed with carbon dioxide gas, should be used for the purpose of releasing the carbon dioxide, since the presence of carbon dioxide tends to slow down the reaction and also since relatively pure aqueous sodium bisulfite is more conveniently prepared than is sulfur dioxide gas free of gases other than carbon dioxide. Moreover, the reaction between the hydrogen sulfide and the sulfur dioxide to produce elementary sulfur should be carried out in vapor phase, rather than with the sulfur dioxide in aqueous solution, in order to facilitate recovery of the sulfur. Of course, any process of the type undergoing consideration must provide for a high degree of recovery of the sodium and sulfur values present in the solution of the melt soda, this being the primary object of any process of this type. It is the object of this invention to provide a process which meets the aforementioned requirements.

This object is accomplished in the following manner:
An aqueous solution of melt soda is first formed and the solution is reacted in a first reaction step with substantially pure carbon dioxide gas in order to produce a substantially sulfide-free solution and a gaseous mixture of carbon dioxide and hydrogen sulfide. The carbon dioxide used in this reaction step need not be absolutely pure, and it can contain, if desired, a small percentage, say up to about 6 percent by volume or slightly more of sulfur dioxide, based upon the carbon dioxide. The extent to which sulfur dioxide is associated with the carbon dioxide as a contaminant will depend upon the relative amounts of sulfur dioxide and hydrogen sulfide employed in the sulfur production step which is described below.

The mixture of carbon dioxide and hydrogen sulfide produced in the first reaction step is reacted in a second reaction step with sulfur dioxide in the vapor phase in order to produce a mixture of carbon dioxide, water vapor and elemental sulfur. This reaction is well known in the art and proceeds essentially accordingly to the following equation:

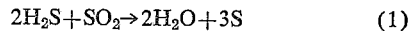

$$2H_2S + SO_2 \rightarrow 2H_2O + 3S \tag{1}$$

This reaction is preferably carried out using a slight excess of sulfur dioxide of from about 5 to 60 percent of that stoichiometrically required by the preceding equation, the purpose of the excess sulfur dioxide being to drive the reaction towards completion, in accordance with well-known chemical principles. In carrying out the process of this invention, it is essential that the hydrogen sulfide and sulfur dioxide be reacted in the vapor phase, rather than with the sulfur dioxide in aqueous phase, inasmuch as when the vapor phase operation is used the problem of sulfur recovery is minimized.

After the elemental sulfur has been produced in the second reaction step, the carbon dioxide, which is associated with the hydrogen sulfide, and which is inert under the conditions of the second reaction step, is separated from the elemental sulfur produced and is returned to the first reaction step along with any excess sulfur dioxide employed in the second reaction step. Also, the elemental sulfur produced in the second reaction step is burned with air in a third reaction step to produce gaseous mixture which contains sulfur dioxide. The burning of elemental sulfur to produce sulfur dioxide is well known in the art. After the gaseous mixture containing sulfur dioxide has been produced, it is contacted with water whereby a portion of the sulfur dioxide is absorbed in the water. Sulfur dioxide is recovered from the water, as by heating or distillation, and sulfur dioxide thus recovered is introduced into the second reaction step described above.

The gaseous mixture still containing sulfur dioxide is then brought into direct contact with aqueous sodium sulfite solution in a third reaction step. When this is done, the sodium sulfite and sulfur dioxide react to form aqueous sodium bisulfite. Aqueous sodium bisulfite thus formed is then reacted in a fourth reaction step with the substantially sufide-free solution produced in the first reaction step, and when this is done aqueous sodium sulfite and carbon dioxide gas are formed. Aqueous sodium sulfite formed in the fourth reaction step is introduced into the third reaction step, in accordance with one embodiment of this invention. On the other hand, aqueous sodium sulfite used in the third reaction step can be derived from a different, convenient source.

In accordance with a further embodiment of this invention, flue gas containing sulfur dioxide and carbon dioxide obtained in the manufacture of the melt soda is directly contacted with the aqueous sodium sulfite solution before that solution is introduced into the third reaction step described above. The flue gas, although generally of low sulfur dioxide content, is rather large in amount, and therefore can be an important source of sulfur values, and the aqueous sodium sulfite before being used in the third reaction step is a particularly effective means of recovering these sulfur values.

The following example illustrates a specific embodiment which falls within the scope of this invention:

*Example*

This example is to be considered in connection with the accompanying drawing. All information concerning gases is on a dry basis.

In the drawing, the numeral 1 designates a conventional plant for the manufacture of a melt soda solution which is withdrawn through line 2. Flue gas obtained in the combustion operation passes through line 3.

The numeral 4 designates a reacting and stripping tower which can be of the bubble cap type. The tower is made of stainless steel and is approximately 2 meters in diameter and 16 meters high. An aqueous solution of melt soda is introduced into the tower 4 by means of line 2 at the rate of 370 liters per minute. This solution is at a temperature of approximately 70° C. and contains combined active sodium expressed as sodium oxide ($Na_2O$) in the amount of 70 grams per liter, so that combined active sodium is introduced through line 2 at the rate of 26.0 kilograms per minute when expressed as sodium oxide. A portion of the combined active sodium present in the solution introduced through line 2 is in the form of sodium sulfide. The amount of combined active sodium in the form of sodium sulfide in the solution introduced through line 2 is 52 grams per liter when expressed as sodium oxide, so that combined active sodium in the form of sodium sulfide is introduced through line 2 at the rate of 19.2 kilograms per minute when expressed as sodium oxide. The remainder of the combined active sodium present in the solution flowing through line 2 is largely sodium carbonate. A stream of carbon dioxide containing a small amount of sulfur dioxide gas is introduced into the tower 4 by means of line 5.

From the top of tower 4 by means of line 6 there is withdrawn a gaseous mixture of carbon dioxide and hydrogen sulfide. This mixture is at a temperature of approximately 75° C. and flows at the rate of 38 cubic meters per minute, when measured at one atmosphere absolute pressure and 0° C. The mixture flowing through line 6 is composed of approximately 82 percent by volume of carbon dioxide and 18 percent by volume of hydrogen sulfide. The mixture flowing through line 6 is introduced into gas cooler 7 where it is brought into indirect heat exchange with cooling water introduced through line 8 and removed through line 9. In the gas cooler 7, the temperature of the gaseous mixture of carbon dioxide and hydrogen sulfide is reduced to approximately 40° C. and water condensed as a result of the cooling is removed by means of line 10. From gas cooler 7 by means of line 11 the gaseous mixture of carbon dioxide and hydrogen sulfide is introduced into compressor 12 and from thence the gaseous mixture by means of line 13 is introduced into one of the known plants 14 for the manufacture of elementary sulfur by the reaction of hydrogen sulfide and sulfur dioxide in vapor phase, liquid sulfur being used to wash sulfur produced from the stream of reaction gases produced. Into plant 14 by means of line 16 there is introduced a stream of gaseous sulfur dioxide and it flows at the rate of approximately 10.7 kilograms per minute.

A gaseous stream composed of carbon dioxide and smaller percentages of sulfur dioxide and water vapor leaves plant 14 by means of line 5. This stream is at a temperature of approximately 130° C., and is composed of about 98.8 percent by volume of carbon dioxide, 0.9 percent by volume of sulfur dioxide, and 0.3 percent by volume of hydrogen sulfide. This gaseous stream is passed into tower 4 at a point where it meets sulfide-free sodium bicarbonate solution. Liquid sulfur is withdrawn at the rate of 14.7 kilograms per minute from plant 14 through line 17 and is introduced into a conventional sulfur burning unit 18 into which there is also introduced make-up sulfur through line 19. Air is introduced through line 20. The unit 18 is of a conventional type and includes means for cooling the hot gases produced by burning the sulfur.

From sulfur burning unit 18 through line 21 there flows a gaseous stream which contains about 14 percent by volume of sulfur dioxide. The gaseous stream flowing through line 21 is introduced into absorption tower 22, which is a contact tower, lined with tile, and having a diameter of approximately 2.0 meters and a height of approximately 10 meters. Water at a temperature of approximately 12° C. is introduced into absorption tower 22 by means of line 23. In tower 22, the gaseous mixture passing through line 21 and the water are brought into direct contact with each other, with the result that a portion of the sulfur dioxide present in the stream passing hrough line 21 is dissolved in the water. The water containing the sulfur dioxide is removed from tower 22 by means of line 23a and is pumped by means of pump 24 to storage vessel 25. From storage vessel 25 by means of line 26 the aqueous solution of sulfur dioxide is transferred to distillation column 27. From the top of distillation column 27 essentially pure sulfur dioxide gas is withdrawn at the rate of 10.7 kilograms per minute through line 16. Water is removed by means of line 28.

Returning now to operation of absorption tower 22, from the top thereof by means of line 29 there is withdrawn a gaseous stream containing sulfur dioxide. This stream is somewhat lower in sulfur dioxide content than is the gaseous stream flowing through line 21, due to the absorption of sulfur dioxide which takes place in the tower 22. The gaseous stream flowing through line 29, containing 22.9 kilograms per minute of sulfur dioxide, is introduced into reaction tower 30, into which there is also introduced by means of line 31 an aqueous solution of sodium sulfite and bisulfite. The tower 30 is suitably a tile-lined, packed tower having a diameter of approximately 2 meters and a height of approximately 8 meters. The solution flows through line 31 at the rate of 530 liters per minute. In the tower 30, sulfur dioxide reacts with sodium sulfite to produce sodium bisulfite in aqueous solution, which is removed from the bottom of the tower by means of line 32 and is introduced into sodium bisulfite solution storage tank 33. From the top of tower 30 by means of line 34 there is withdrawn a stream of waste gas which is composed largely of nitrogen.

From storage tank 33 through line 35a there is withdrawn a stream of sodium bisulfite solution which flows at the rate of 530 liters per minute and which contains 70 grams per liter of sodium bisulfite expressed in terms of sodium oxide (235 grams per liter of $NaHSO_3$). The stream flowing through line 35a is divided into streams 35 and 36. The stream flowing through line 35 amounts to 160 liters per minute and is introduced into mixer 37. The remainder of the stream flowing through line 35a is introduced by means of line 36 into tower 4. In tower 4, the sodium bisulfite present in the stream flowing through line 36 and the substantially sulfide-free solution produced in the upper portion of tower 4 react to release carbon dioxide gas and form an aqueous solution of sodium sulfite. Steam is introduced into the bottom of tower 4 through line 53 to increase the rate of the reaction resulting in the release of carbon dioxide. A portion of the carbon dioxide produced is removed from tower 4 by means of line 38 at a point where the carbon dioxide is free of sulfur dioxide. This point is somewhat above the point where line 5 enters the tower. The amount of carbon dioxide flowing through line 38 is approximately 2 cubic meters per minute. The remainder of the carbon dioxide gas produced passes upwards through tower 4 and is removed by means of line 6.

From the bottom to tower 4 by means of line 39 there is withdrawn an aqueous solution of sodium sulfite flowing at the rate of approximately 740 liters per minute and containing approximately 70 grams per liter of sodium sulfite expressed as sodium oxide (142 grams per liter of $Na_2SO_3$). This stream passes through heat exchanger 40 and is introduced into sodium sulfite solution storage vessel 41. From vessel 41 there is withdrawn aqueous sodium sulfite solution at the rate of approximately 740 liters per minute by means of line 42. The stream flowing through line 42 is divided into streams 43 and 44. Stream 43 flows at the rate of approximately 210 liters per minute and is introduced into mixer 37, into which by means of line 45 there is introduced water as required, depending upon how it is desired to operate the pulping operation. Through line 46 there passes an aqueous solution which is a mixture of sodium sulfite and sodium bisulfite and which is suitable for use in the treatment of further amounts of wood to produce pulp. Line 46 enters storage tank 47, and from this tank by means of line 48 the sodium bisulfite solution is passed for further use in pulping.

The stream of aqueous sodium sulfite passing through line 44 is introduced into scrubber 49, into the bottom of which by means of line 3 there is introduced a stream of flue gas which is at a temperature of approximately 130° C., which flows at the rate of approximately 1200 cubic meters per minute measured at one atmosphere absolute pressure and 0° C. and which contains about 0.6 percent by volume of sulfur dioxide. In scrubber 49 the stream of flue gas is scrubbed with a stream of aqueous sodium sulfite solution, the purpose of this being to recover sulfur values present in the flue gas flowing through line 3 by reacting sodium sulfite and sulfur dioxide to produce sodium bisulfite. Waste gas is withdrawn from scrubber 49 by means of line 50, and the solution of sodium sulfite and sodium bisulfite produced is removed by means of line 51. The aqueous sodium sulfite and sodium bisulfite passing through line 51 is introduced into storage tank 52, and from thence by means of line 31 into tower 30.

In the specific example, the carbonating and sulfiting steps are carried out in a single tower 4. As will be evident to those skilled in the art, these two reactions can be carried out in separate towers, means being provided for the transfer of solution undergoing treatment from the tower in which the carbonating is being carried out to the tower in which the sulfiting is being carried out.

This application is a continuation-in-part of our copending application, Serial No. 565,472, filed February 14, 1956, now U.S. Patent 2,909,407.

What is claimed is:

1. A method for the preparation of alkali sulfite from alkali and sulfide sulfur recovered from a melt soda solution containing the same which comprises the steps of (1) reacting said solution with substantially pure carbon dioxide gas whereby a substantially sulfide-free solution and a gaseous mixture of carbon dioxide and hydrogen sulfide are formed, (2) reacting said mixture of carbon dioxide and hydrogen sulfide with sulfur dioxide in vapor phase whereby a mixture of carbon dioxide, water vapor and elemental sulfur is formed, (3) separating the carbon dioxide from the the elemental sulfur, (4) introducing carbon dioxide separated in step (3) into reaction step (1), (5) burning the elemental sulfur with air to produce a gaseous mixture containing sulfur dioxide, (6) contacting said gaseous mixture with water whereby a portion of the sulfur dioxide is absorbed in the water and remaining sulfur dioxide is in gaseous form, (7) recovering sulfur dioxide from the water, (8) introducing essentially pure sulfur dioxide gas from step (7) into reaction step (2), (9) passing the unabsorbed gaseous sulfur dioxide from step (6) into contact with aqueous sodium sulfite whereby aqueous sodium bisulfite is formed, (10) reacting part of the aqueous sodium bisulfite thus formed with said substantially sulfide-free solution produced in step (1) whereby aqueous sodium sulfite and carbon dioxide gas are formed, (11) introducing part of the aqueous sodium sulfite thus formed into reaction step (9) and (12) recovering remaining sodium bisulfite of step (9) and remaining sodium sulfite of step (10).

2. A method for the preparation of alkali sulfite from alkali and sulfide sulfur recovered from a melt soda solution containing the same which comprises the steps of (1) reacting said solution with substantially pure carbon dioxide gas whereby a substantially sulfide-free solution and a gaseous mixture of carbon dioxide and hydrogen sulfide are formed, (2) reacting said mixture of carbon dioxide and hydrogen sulfide with sulfur dioxide in vapor phase whereby a mixture of carbon dioxide, water vapor and elemental sulfur is formed, (3) separating the carbon dioxide from the elemental sulfur, (4) introducing carbon dioxide separated in step (3) into reaction step (1), (5) burning the elemental sulfur with air to produce a gaseous mixture containing sulfur dioxide, (6) contacting said gaseous mixture with water whereby a portion of the sulfur dioxide is absorbed in the water and remaining sulfur dioxide is in gaseous form, (7) recovering sulfur dioxide from the water, (8) introducing essentially pure sulfur dioxide gas from step (7) into reaction step (2), (9) passing the unabsorbed gaseous sulfur dioxide from step (6) into contact with aqueous sodium sulfite whereby aqueous sodium bisulfite is formed, (10) reacting part of the aqueous sodium bisulfite thus formed with said substantially sulfide-free solution produced in step (1) whereby aqueous sodium sulfite and carbon dioxide gas are formed and (11) recovering remaining sodium bisulfite from step (10).

3. A method for the preparation of alkali sulfite from flue gas containing carbon dioxide and sulfur dioxide produced in the production of a melt soda and from alkali and sulfide sulfur recovered from said melt soda solution containing the same which comprises the steps of (1) reacting said solution with substantially pure carbon dioxide gas whereby a substantially sulfide-free solution and a gaseous mixture of carbon dioxide and hydrogen sulfide are formed, (2) reacting said mixture of carbon dioxide and hydrogen sulfide with sulfur dioxide in vapor phase whereby a mixture of carbon dioxide, water vapor and elemental sulfur is formed, (3) separating the carbon dioxide from the elemental sulfur, (4) introducing carbon dioxide separated in step (3) into reaction step (1), (5) burning the elemental sulfur with air to produce a gaseous mixture containing sulfur dioxide, (6) contacting said gaseous mixture with water whereby a portion of the sulfur dioxide is absorbed in the water and remaining sulfur dioxide is in gaseous form, (7) recovering sulfur dioxide from the water, (8) introducing essentially pure sulfur dioxide gas from step (7) into reaction step (2), (9) contacting said flue gas with aqueous sodium sulfite whereby an aqueous mixture of sodium sulfite and sodium bisulfite is formed, (10) passing the unabsorbed gaseous sulfur dioxide remaining after step (6) into contact with the aqueous mixture of sodium sulfite and sodium bisulfite produced in step (9) whereby an aqueous sodium bisulfite is formed, (11) reacting part of the aqueous sodium bisulfite thus formed with said substantially sulfide-free solution produced in step (1) whereby aqueous sodium sulfite and carbon dioxide gas are formed, (12) introducing part of the aqueous sodium sulfite thus formed into reaction step (9) and (13) recovering remaining sodium bisulfate of step (9) and remaining sodium sulfite of step (10).

References Cited in the file of this patent

UNITED STATES PATENTS

| | | |
|---|---|---|
| 2,789,883 | Cook | Apr. 23, 1957 |
| 2,800,388 | Ahlborg et al. | July 23, 1957 |
| 2,909,407 | Ahlborg et al. | Oct. 20, 1959 |